US012620819B2

(12) United States Patent
Chen et al.

(10) Patent No.: US 12,620,819 B2
(45) Date of Patent: May 5, 2026

(54) DISCHARGE CIRCUIT, BATTERY MANAGEMENT SYSTEM, BATTERY, PROTECTION METHOD, AND ELECTRICAL APPARATUS

(71) Applicant: CONTEMPORARY AMPEREX TECHNOLOGY (HONG KONG) LIMITED, Hong Kong (CN)

(72) Inventors: Hui Chen, Ningde (CN); Yanhui Fu, Ningde (CN); Le Chu, Ningde (CN); Maobo Guo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 871 days.

(21) Appl. No.: 17/940,762

(22) Filed: Sep. 8, 2022

(65) Prior Publication Data

US 2023/0139265 A1 May 4, 2023

Related U.S. Application Data

(63) Continuation of application No. PCT/CN2022/089068, filed on Apr. 25, 2022.

(30) Foreign Application Priority Data

Nov. 1, 2021 (CN) .......................... 202111283737.5

(51) Int. Cl.
*H02J 7/00* (2026.01)
*H02H 9/04* (2006.01)
*H02J 7/64* (2026.01)

(52) U.S. Cl.
CPC ................ *H02J 7/64* (2026.01); *H02H 9/04* (2013.01)

(58) Field of Classification Search
None
See application file for complete search history.

(56) References Cited

U.S. PATENT DOCUMENTS 9,081,069 B2 * 7/2015 Shibata ................ G01R 31/396
9,527,396 B2 * 12/2016 Nishina ............... H01M 10/425
(Continued)

FOREIGN PATENT DOCUMENTS

CN 109905019 A 6/2019
CN 110492459 A 11/2019
(Continued)

OTHER PUBLICATIONS

The Japan Patent Office (JPO) Notification of Reasons for Refusal for Application No. 2022-548745 Dec. 19, 2023 12 Pages(including translation).
(Continued)

*Primary Examiner* — Arun C Williams
(74) *Attorney, Agent, or Firm* — ANOVA LAW GROUP, PLLC

(57) ABSTRACT

A discharge circuit includes a first branch configured to be connected to a protected unit and a second branch connected in parallel to the first branch. The first branch includes a first overvoltage protection device configured to passively discharge a surge voltage. The second branch includes a second overvoltage protection device and a control switch connected in series. The control switch is configured to be connected to a control unit, and to be opened or closed based on a control signal of the control unit.

15 Claims, 6 Drawing Sheets

(56) References Cited

U.S. PATENT DOCUMENTS

| | | | |
|---|---|---|---|
| 10,454,360 B1 | 10/2019 | Dashtestani et al. | |
| 2005/0242779 A1* | 11/2005 | Yoshio | H02H 3/044 |
| | | | 320/134 |
| 2012/0243136 A1 | 9/2012 | Mossoba et al. | |
| 2016/0352093 A1 | 12/2016 | Striewe et al. | |
| 2018/0019603 A1 | 1/2018 | Chen | |

FOREIGN PATENT DOCUMENTS

| | | | |
|---|---|---|---|
| CN | 111327030 A | 6/2020 | |
| CN | 210970699 U | 7/2020 | |
| CN | 112383114 A | 2/2021 | |
| CN | 112448379 A | 3/2021 | |
| CN | 112838573 A | 5/2021 | |
| CN | 214380045 U | 10/2021 | |
| DE | 3915198 A1 | 11/1990 | |
| JP | H09298834 A | 11/1997 | |
| JP | H10201232 A | 7/1998 | |
| JP | H10201292 A | 7/1998 | |
| JP | 2002010517 A | 1/2002 | |
| JP | 2007312460 A | 11/2007 | |
| JP | 2008529159 A | 7/2008 | |
| JP | 2009106039 A | 5/2009 | |
| JP | 2009195033 A | 8/2009 | |
| JP | 2017108608 A | 6/2017 | |
| JP | 2017118704 A | 6/2017 | |
| KR | 20200123198 A | 10/2020 | |

OTHER PUBLICATIONS

The World Intellectual Property Organization (WIPO) International Search Report and Written Opinion for PCT/CN2022/089068 Jun. 20, 2022 14 pages (Including English translation).

The China National Intellectual Property Administration (CNIPA) Notification of Grant of Invention Patent Right for CN Application No. 202111283737.5 Sep. 18, 2023 6 Pages (Including English translation).

The European Patent Office (EPO) The Extended Search Report for EP Application No. 22746938.4 Jul. 26, 2023 8 Pages.

Japan Patent Office (JPO) The Office Action For JP Application No. 2022-548745 Jun. 25, 2024 6 Pages (Translation Included ).

Korean Intellectual Property Office (KIPO) The Notice of Submission of Opinion No. 9-5-2024-077772945 Sep. 12, 2024 6 Pages (Translation Included ).

The Korean Intellectual Property Office Notice of Allowance for Application No. 10-2022-7028064 Nov. 3, 2025 4 Pages (including translation).

* cited by examiner

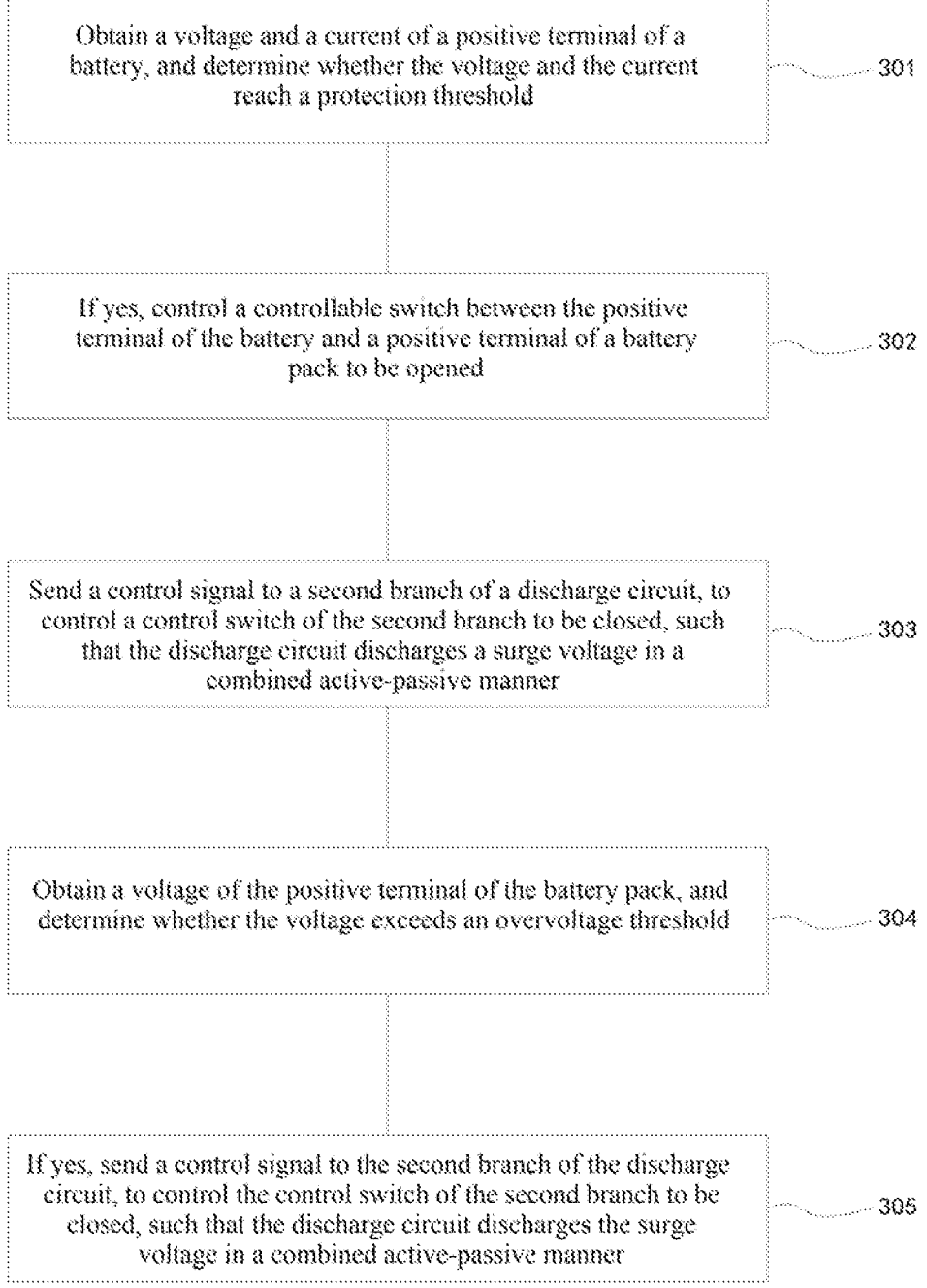

Obtain a voltage and a current of a positive terminal of a battery, and determine whether the voltage and the current reach a protection threshold — 301

If yes, control a controllable switch between the positive terminal of the battery and a positive terminal of a battery pack to be opened — 302

Send a control signal to a second branch of a discharge circuit, to control a control switch of the second branch to be closed, such that the discharge circuit discharges a surge voltage in a combined active-passive manner — 303

Obtain a voltage of the positive terminal of the battery pack, and determine whether the voltage exceeds an overvoltage threshold — 304

If yes, send a control signal to the second branch of the discharge circuit, to control the control switch of the second branch to be closed, such that the discharge circuit discharges the surge voltage in a combined active-passive manner — 305

*FIG. 7*

DISCHARGE CIRCUIT, BATTERY MANAGEMENT SYSTEM, BATTERY, PROTECTION METHOD, AND ELECTRICAL APPARATUS

CROSS-REFERENCE TO RELATED APPLICATIONS

The present application is a continuation of International Application No. PCT/CN2022/089068, filed on Apr. 25, 2022, which claims priority to Chinese Patent Application No. 202111283737.5, entitled "DISCHARGE CIRCUIT, BATTERY MANAGEMENT SYSTEM, BATTERY, PROTECTION METHOD, AND ELECTRICAL APPARATUS", filed on Nov. 1, 2021, the entire contents of both of which are incorporated herein by reference.

TECHNICAL FIELD

The present application relates to the field of battery technologies, and specifically to a discharge circuit, a battery management system, a battery, a protection method, and an electrical apparatus.

BACKGROUND ART

As new energy technologies advance, battery technology, especially lithium battery technology, has developed rapidly.

In the existing technologies, a battery management system (BMS) is used to effectively manage a battery. However, the battery management system is a low-voltage system, has a specific limit on a voltage withstand requirement for a high voltage, and cannot be completely galvanically isolated. The battery management system will be damaged when the high voltage exceeds a withstand voltage limit of the battery management system.

Therefore, how to effectively protect the battery management system from overvoltage and overcurrent is a technical problem that needs to be solved urgently.

SUMMARY OF THE DISCLOSURE

In view of the above problem, the present application provides a discharge circuit, a battery management system, a battery, a protection method, and an electrical apparatus, which can solve the problem of the battery management system being damaged due to a high-voltage surge.

According to a first aspect, the present application provides a discharge circuit, including: a first branch configured to be connected to a protected unit, and including a first overvoltage protection device configured to passively discharge a surge voltage; and a second branch including a second overvoltage protection device and a control switch connected in series, the second branch being connected in parallel with the first branch, where the control switch is configured to be connected to a control unit, and to be opened or closed based on a control signal of the control unit.

In the technical solution of this embodiment of the present application, two branches are provided in the discharge circuit. The first branch can use the first overvoltage protection device to passively discharge the surge voltage, thereby protecting the protected unit from overvoltage. The second branch is not only provided with the second overvoltage protection device but also provided with the control switch. The control unit of the battery management system may be used to control the control switch to be opened or closed, such that the second branch participates in actively discharging the surge voltage, and the discharge circuit discharges the surge voltage of the protected unit in a combined active-passive manner. This ensures that no overvoltage occurs in the protected unit, thereby further protecting the battery management system from being damaged due to a relatively large surge.

In some embodiments, the first branch includes N first sub-branches, and the first overvoltage protection device is connected in series to each of the first sub-branches. The first overvoltage protection devices of the N first sub-branches are connected in parallel, N being a positive integer greater than or equal to 2.

In this embodiment, the first branch is provided as the N first sub-branches, and the N first overvoltage protection devices are provided in parallel in the first branch, so that the N first overvoltage protection devices can cooperatively discharge the surge received by the protected unit, thereby improving the capability of passively discharging the surge.

In some embodiments, the first sub-branch further includes a first resistor connected in series to the first overvoltage protection device. When the first branch is connected to the protected unit, the first resistor is located on a side closer to the protected unit than the first overvoltage protection device.

In this embodiment of the present application, the first resistor can effectively play a current limiting role. That is, the first resistor is a current limiting resistor, and can effectively reduce power consumption of the first overvoltage protection device.

In some embodiments, a $1^{st}$ first sub-branch of the first branch is connected to the protected unit, one end of each of a $2^{nd}$ first sub-branch to an $N^{th}$ first sub-branch is connected between the first resistor and the first overvoltage protection device of a previous first sub-branch, and the other end of each of the $2^{nd}$ first sub-branch to the $N^{th}$ first sub-branch is grounded, N being a positive integer greater than or equal to 2.

In this embodiment of the present application, the N first sub-branches are sequentially connected in the above manner, and the first branch forms a continuous multi-stage passive discharge branch. To be specific, when the $1^{st}$ first sub-branch has a limited ability to absorb and suppress, the $2^{nd}$ first sub-branch to an $N^{th}$ first sub-branch connected in sequence can share the energy, and cooperate with the first sub-branch to absorb the surge voltage together, which improves the ability to absorb the surge voltage. In addition, the provision of a plurality of first sub-branches to work together can enhance the service life of the first overvoltage protection device as compared to the first branch having only one first overvoltage protection device.

In some embodiments, the second branch includes M second sub-branches connected in parallel, and each of the second sub-branches has a second overvoltage protection device and a control switch connected in series. M is a positive integer greater than or equal to 2, and all of the control switches are configured to be connected to the control unit.

In this embodiment of the present application, the M second sub-branches are provided, and a plurality of active discharge paths are formed. When the battery management system uses the discharge circuit of the present application, one or more of the M second sub-branches can be controlled by the control unit to participate in actively discharging the voltage, so as to handle various situations in which overvoltage occurs in the protected unit. This makes the combined active-passive manner for discharging the surge more practical, thereby improving the effect of discharging the surge.

In some embodiments, the second sub-branch further includes a second resistor connected in series to the second overvoltage protection device. One end of each of the M second sub-branches closer to the second resistor is connected to a position between the first resistor and the first overvoltage protector of the $N^{th}$ first sub-branch, and one end of each of the M second sub-branches closer to the second overvoltage protection device is grounded, both M and N being positive integers greater than or equal to 2.

The second resistor acts similarly to the first resistor, and is also used as a current limiting resistor. The second resistor can also effectively reduce power consumption of the second overvoltage protection device.

In some embodiments, the first overvoltage protection device and the second overvoltage protection device each are a transient voltage suppression diode.

The transient voltage suppression diode, used as the first overvoltage protection device and the second overvoltage protection device, can suddenly reduce its impedance at a very high speed, and simultaneously absorb a large current, to clamp a voltage between its two terminals at a predetermined value, to prevent subsequent circuit elements from being damaged under the impact of transient high energy, which can effectively absorb the surge.

In some embodiments, the control switch is a MOS transistor.

In this embodiment of the present application, the MOS transistor has characteristics of conventionality, low price, easy control, and stable control, and therefore using the MOS transistor as the control switch can make the entire discharge circuit easy to control, thereby reducing the cost.

According to a second aspect, the present application provides a battery management system, including: a discharge circuit in the foregoing embodiment; and a microcontroller, a voltage sampling unit, and a multi-stage voltage comparison unit. At least one of the microcontroller, the voltage sampling unit, or the multi-stage voltage comparison unit is connected to a control switch of a second branch of the discharge circuit. The control switch receives a control signal from the microcontroller, the voltage sampling unit, or the multi-stage voltage comparison unit, and is opened or closed based on the control signal.

In this embodiment of the present application, by additionally providing the discharge circuit, when the protected unit of the battery management system is attacked by a relatively large surge, the first branch and the second branch in the discharge circuit may be used to discharge the surge voltage of the protected unit in a manner combining passive discharge and active discharge, to ensure that no overvoltage occurs in the protected unit, thereby further protecting the battery management system from being damaged due to the relatively large surge.

In some embodiments, the battery management system further includes: a switch control unit connected to a control terminal of the control switch of the second branch of the discharge circuit. At least one of the microcontroller, the voltage sampling unit, or the multi-stage voltage comparison unit is connected to the switch control unit.

The provision of the switch control unit can make it more convenient and stable to control the control switch in the second branch.

According to a third aspect, the present application provides a discharge protection method for a battery management system, applied to the foregoing battery management system, and including: obtaining a voltage of a protected unit, and determining whether the voltage exceeds an overvoltage threshold; and if yes, sending a control signal to a second branch of a discharge circuit, to control a control switch of the second branch to be closed, such that the discharge circuit discharges a surge voltage in a combined active-passive manner.

In this embodiment of the present application, according to this method, when overvoltage occurs in the protected unit, if overvoltage still exists after the first branch passively discharges the surge voltage, the second branch may be controlled to be connected, to implement active surge discharge. This allows to discharge a high-energy surge in a combined active-passive manner, thereby preventing the overvoltage of the protected unit from further causing overvoltage in the battery management system. This method is applicable to the battery management system having the above discharge circuit, to enable an efficient operation of the discharge circuit in the battery management system.

In some embodiments, before the obtaining a voltage of a protected unit, and determining whether the voltage exceeds an overvoltage threshold, the discharge protection method further includes: obtaining a voltage and a current of a positive terminal of a battery, and determining whether the voltage and the current reach a protection threshold; if yes, controlling a controllable switch between the positive terminal of the battery and a positive terminal of a battery pack to be opened; and sending a control signal to the second branch of the discharge circuit, to control the control switch of the second branch to be closed, such that the discharge circuit discharges the surge voltage in a combined active-passive manner. The protected unit is the positive terminal of the battery pack.

In this embodiment of the present application, the positive terminal of the battery pack is used as the protected unit, and when overvoltage and/or overcurrent occur in the positive terminal of the battery module, and the generated surge acts on the positive terminal of the battery pack, the second branch may be controlled to be connected to actively discharge the surge voltage while the first branch of the discharge protection circuit performs the passive discharge, to ensure that no overvoltage occurs in the positive terminal of the battery pack, thereby protecting the entire battery management system from being damaged under the action of the surge.

In some embodiments, the method of "obtaining a voltage of a protected unit, and determining whether the voltage exceeds an overvoltage threshold; and if yes, sending a control signal to a second branch of a discharge circuit, to control a control switch of the second branch to be closed, such that the discharge circuit discharges a surge voltage in a combined active-passive manner" is performed cyclically, until an obtained voltage of the protected unit does not exceed the overvoltage threshold.

A cyclic active discharge of the surge voltage can make a relatively large surge quickly discharged, to ensure that the voltage of the protected unit is below the protection threshold, and no overvoltage occurs, thereby avoiding a failure to discharge the voltage of the protected unit below the protection threshold through a single active discharge.

In some embodiments, the obtained voltage of the protected unit is divided into a plurality of levels from low to high when the obtained voltage of the protected unit exceeds the overvoltage threshold; and a quantity of second sub-branches in the discharge circuit that are connected is controlled to gradually increase, corresponding to the plurality of voltage levels from high to low.

The quantity of second sub-branches to work together to discharge the surge can be intelligently controlled by dividing the overvoltage into the plurality of levels, so as to implement intelligent and rapid surge discharge.

According to a fourth aspect, the present application provides a battery, including: a battery management system in the foregoing embodiment.

According to a fifth aspect, the present application provides an electrical apparatus, including a battery according to any one of the foregoing embodiments. The battery is configured to provide electrical energy.

The above description is merely a summary of the technical solutions of the present application. To make the technical means of the present application more clearly, so as to be implemented according to the content of the description, and to make the above and other objectives, features, and advantages of the present application more obvious and comprehensible, the specific embodiments of the present application are listed below.

BRIEF DESCRIPTION OF THE DRAWINGS

Various other advantages and benefits will become apparent to those of ordinary skill in the art upon reading the following detailed description of some embodiments. The drawings are merely for the purpose of illustrating some embodiments, and are not to be considered a limitation to the present application. In addition, the same reference numeral is used to denote the same component throughout the drawings. In the drawings:

FIG. 7 is a schematic flowchart of another discharge protection method for a battery management system according to some embodiments of the present application.

Figure 1:
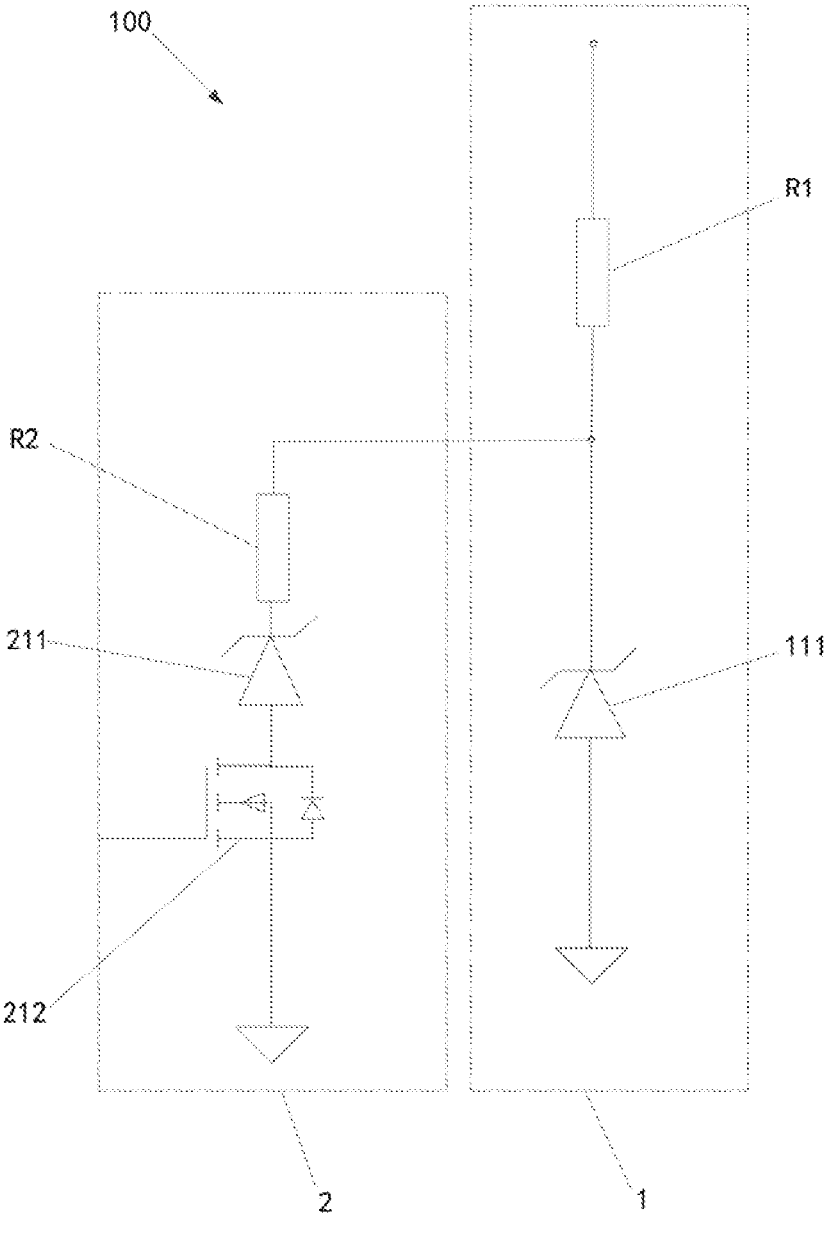
FIG. 1 is a schematic structural diagram of a discharge circuit according to some embodiments of the present application.

Reference numerals in the embodiments:

100: discharge circuit; 200: battery management system; 1: first branch; 11: first sub-branch; 111: first overvoltage protection device; R1: first resistor; 2: second branch; 21: second sub-branch; 211: second overvoltage protection device; 212: control switch; R2: second resistor; 3: microcontroller; 4: voltage sampling unit; 5: multi-stage voltage comparison unit; 6: overcurrent protection unit; V1: positive terminal of a battery; and V2: positive terminal of a battery pack.

DETAILED DESCRIPTION OF EMBODIMENTS

The embodiments of the technical solutions of the present application are described in detail below with reference to the accompanying drawings. The following embodiments are merely used to illustrate the technical solutions of the present application more clearly. Therefore, they are merely used as examples, and shall not be used to limit the scope of protection of the present application.

Unless otherwise defined, all technical and scientific terms used herein have the same meaning as those generally understood by those skilled in the art of the present application. The terms used herein are for the purpose of describing the specific embodiments, and are not intended to limit the present application. The terms "including/comprising" and "having" and any variations thereof in the specification and claims and the above brief description of the drawings are intended to cover a non-exclusive inclusion.

In the description of the embodiments of the present application, the technical terms "first", "second", etc. are merely used to distinguish different objects, and should not be understood as indicating or implying relative importance or the number, specific order, or priority relationship of the indicated technical features. In the description of the embodiments of the present application, "a plurality of" means two or more, unless otherwise expressly and specifically defined.

The "embodiment" mentioned herein means that a particular feature, structure, or characteristic described with reference to the embodiment can be included in at least one embodiment of the present application. This term appearing in various parts of the specification not necessarily refers to the same embodiment, nor an independent or alternative embodiment that is mutually exclusive to other embodiments. Those skilled in the art should explicitly and implicitly understand that the embodiments described herein may be combined with other embodiments.

In the description of the embodiments of the present application, the term "and/or" is merely used to describe an association relationship between associated objects, indicating that there may be three relationships. For example, A and/or B may indicate that: A exists, both A and B exist, and B exists. In addition, the character "/" used herein generally indicates that the associated objects are in an "or" relationship.

In the description of the embodiments of the present application, the term "a plurality of" means at least two (including two). Similarly, "a plurality of groups" means at least two groups (including two groups); and "a plurality of pieces" means at least two pieces (including two pieces).

In the description of the embodiments of the present application, orientation or position relationships indicated by the terms such as "central", "longitudinal", "transverse", "length", "width", "thickness", "upper", "lower", "front", "rear", "left", "right", "vertical", "horizontal", "top", "bottom", "inner", "outer", "clockwise", "anticlockwise", "axial direction", "radial direction", "circumferential direction", etc. are orientation or position relationships based on the drawings and are merely intended to facilitate the description of the embodiments of the present application and simplify the description, rather than indicating or implying that the apparatus or element mentioned must have a particular orientation or be constructed and operated in a particular orientation, and therefore should not be interpreted as limiting the present application.

In the description of the embodiments of the present application, unless otherwise expressly specified and defined, the technical terms "mount", "engage", "connect", "fasten", etc. should be interpreted in a broad sense, which, for example, may mean a fixed connection, a detachable connection or an integral connection; may mean a mechanical connection or an electrical connection; and may mean a direct connection, an indirect connection by means of an intermediary, internal communication between two elements, or an interaction between two elements. Those of ordinary skill in the art can understand the specific meanings of the above terms in the embodiments of the present application based on specific situations.

In the existing technologies, with the clean energy development, an increasing number of apparatuses use electrical energy as driving energy, which further promotes rapid development of batteries that can store a large amount of electrical energy and can be repeatedly charged and discharged, such as lithium-ion batteries. The batteries are not only applied to energy storage power systems such as hydropower, thermal power, wind power, and solar power plants, but also widely applied to electric transportation means such as electric bicycles, electric motorcycles, and electric cars, as well as military equipment and aerospace, etc.

The inventors have noticed that, a battery management system, as the brain of the batteries, is mainly applied to batteries of two-wheeled vehicles and hybrid vehicles is a low-voltage system. Use scenarios have become more complex and diverse with increasing use of the two-wheeled vehicles and the hybrid vehicles. For example, in a use scenario of steep downhill, magnetic lines of force of a two-wheeled vehicle drive motor cut a magnetic field at a high speed to generate a high-voltage potential, and the high-voltage potential is superimposed on a contact terminal of the battery management system. Alternatively, in a large-current charging process, for the purpose of battery protection, a surge voltage caused by a load terminal is superimposed on two ends of the battery management system the moment when a current is cut off. The battery management system is a low-voltage system, has a specific limit on a voltage withstand requirement for a high voltage, and cannot be completely galvanically isolated. The battery management system will be damaged when the high voltage exceeds a withstand voltage limit of the battery management system.

To prevent the above problem, the most common solution at present is connecting a discharge circuit having an overvoltage protection device across two terminals of a protected unit in contact with the battery management system, and using the overvoltage protection device in the discharge circuit to absorb a surge of a certain range of energy. However, this solution has a fixed and constant ability to suppress the surge voltage. When the energy of the surge exceeds maximum tolerance of the overvoltage protection device, the overvoltage protection device will be broken down or even burned, thus no longer acting as protection. Further, the surge voltage will act on the protected unit, and thereby the battery management system in contact with the protected unit will be easily damaged due to the surge.

To solve the above problem, the inventors have found that a branch having an active discharge function may be added to the existing discharge circuit that passively discharges the surge voltage, and a connection of the branch having the active discharge function may be controlled by using a control unit of the battery management system. In this way, the surge voltage of the protected unit can be discharged both actively and passively, thereby solving the above problem.

The discharge circuit disclosed in the embodiments of the present application may be applied to, but not limited to, any battery management system, and may also be applied to any electronic management system, electronic device management system, etc. for surge discharge.

The battery management system disclosed in the embodiments of the present application may be applied to batteries of various current application scenarios, types, power levels, or shapes.

The battery disclosed in the embodiments of the present application may be used in, but not limited to, an electrical apparatus such as a vehicle, a ship or an aircraft, etc. The battery management system, the battery, and the like disclosed in the present application may be used to form a power supply system of the electrical apparatus, which helps solve the surge problem in various scenarios.

The embodiments of the present application provide an electrical apparatus using a battery as a power source. The electrical apparatus may be, but is not limited to, a mobile phone, a tablet, a notebook computer, an electric toy, a power tool, a battery cart, an electric car, a ship, a spacecraft, etc. The electric toy may include a stationary or mobile electric toy, such as a game console, an electric car toy, an electric ship toy, an electric airplane toy, etc. The spacecraft may include an airplane, a rocket, a space shuttle, a spaceship, etc.

Figure 4:
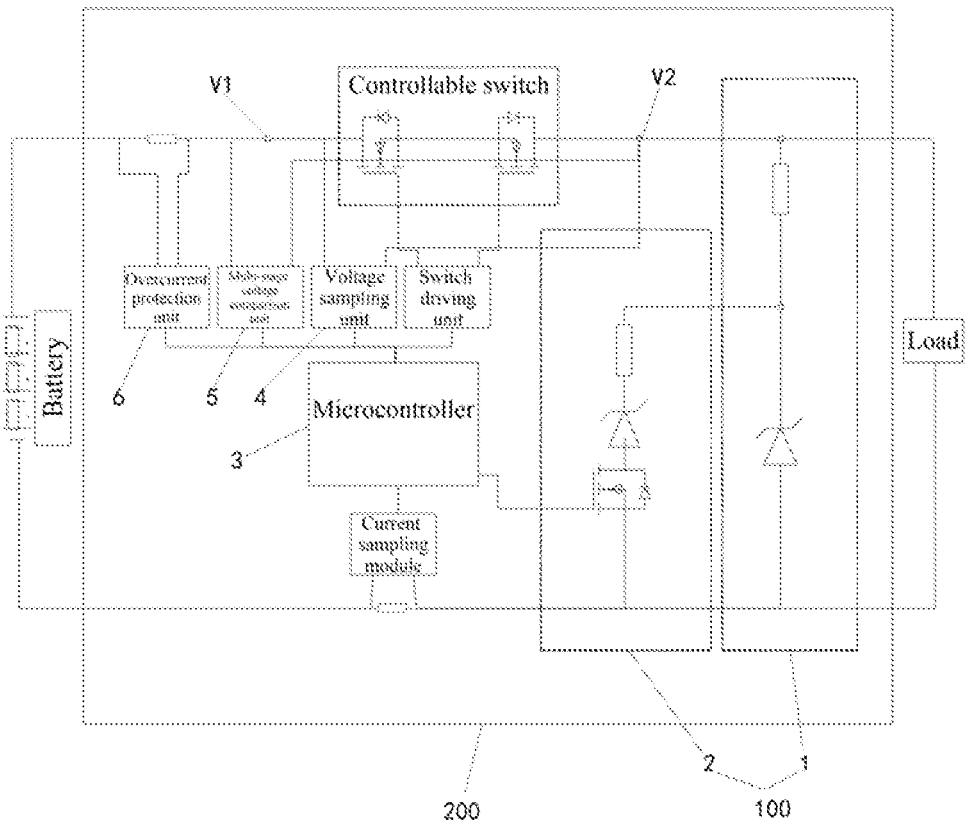
FIG. 4 is a schematic structural diagram of a battery management system according to some embodiments of the present application.

As shown in FIG. 1, according to some embodiments of the present application, the present application provides a discharge circuit 100, including: a first branch 1 and a second branch 2. The first branch 1 is configured to be connected to a protected unit, and includes a first overvoltage protection device 111 configured to passively discharge a surge voltage. The second branch 2 includes a second overvoltage protection device 211 and a control switch 212 connected in series. The second branch 2 is connected in parallel to the first branch 1. As shown in FIG. 4, the control switch 212 is configured to be connected to a control unit of a battery management system 200, and to be opened and closed based on a control signal of the control unit.

Specifically, the first branch 1 and the second branch 2 each may be a circuit that can be independently connected, and each may have at least two connection terminals. The first branch 1 may be directly connected across two terminals of the protected unit. Alternatively, one end of the first branch 1 may be connected at the protected unit, and the other end of the first branch 1 is grounded. In other words, the first branch 1 is connected to the protected unit (e.g., such connection is made when a certain connection terminal is protected), as long as a surge voltage acting on the protected unit can be transferred to the first branch 1. The second branch 2 is connected in parallel to the first branch 1, which may be implemented in a way that a first end is connected to the end of the first branch 1 connected to the protected unit, and the other end is grounded, or the two ends of the second branch 2 are directly connected to the two ends of the first branch 1.

The protected unit may be an electronic component, a circuit having an independent function, or may be an electrical terminal (e.g., a positive terminal V2 of a battery pack).

The first overvoltage protection device 111 and the second overvoltage protection device 211 may be the same type of component, or may be different types of components having the same function. The first overvoltage protection device 111 and the second overvoltage protection device 211 each may be one of a solid-state discharge chip or a transient voltage suppression diode (TVS diode).

The control switch 212 may be any controllable switch that enables closing and opening control, such as a transistor, e.g., a MOS transistor.

In the technical solution of this embodiment of the present application, two branches are provided in the discharge circuit 100. The first branch 1 can use the first overvoltage protection device 111 to passively discharge the surge voltage, thereby protecting the protected unit from overvoltage. The second branch 2 is not only provided with the second overvoltage protection device 211 but also provided with the control switch 212. The control unit of the battery management system 200 may be used to control the control switch 212 to be opened or closed, such that the second branch 2 participates in actively discharging the surge voltage, and the discharge circuit 100 discharges the surge voltage of the protected unit in a combined active-passive manner. This ensures that no overvoltage occurs in the protected unit, thereby further protecting the battery management system 200 from being damaged due to a relatively large surge.

Figure 2:
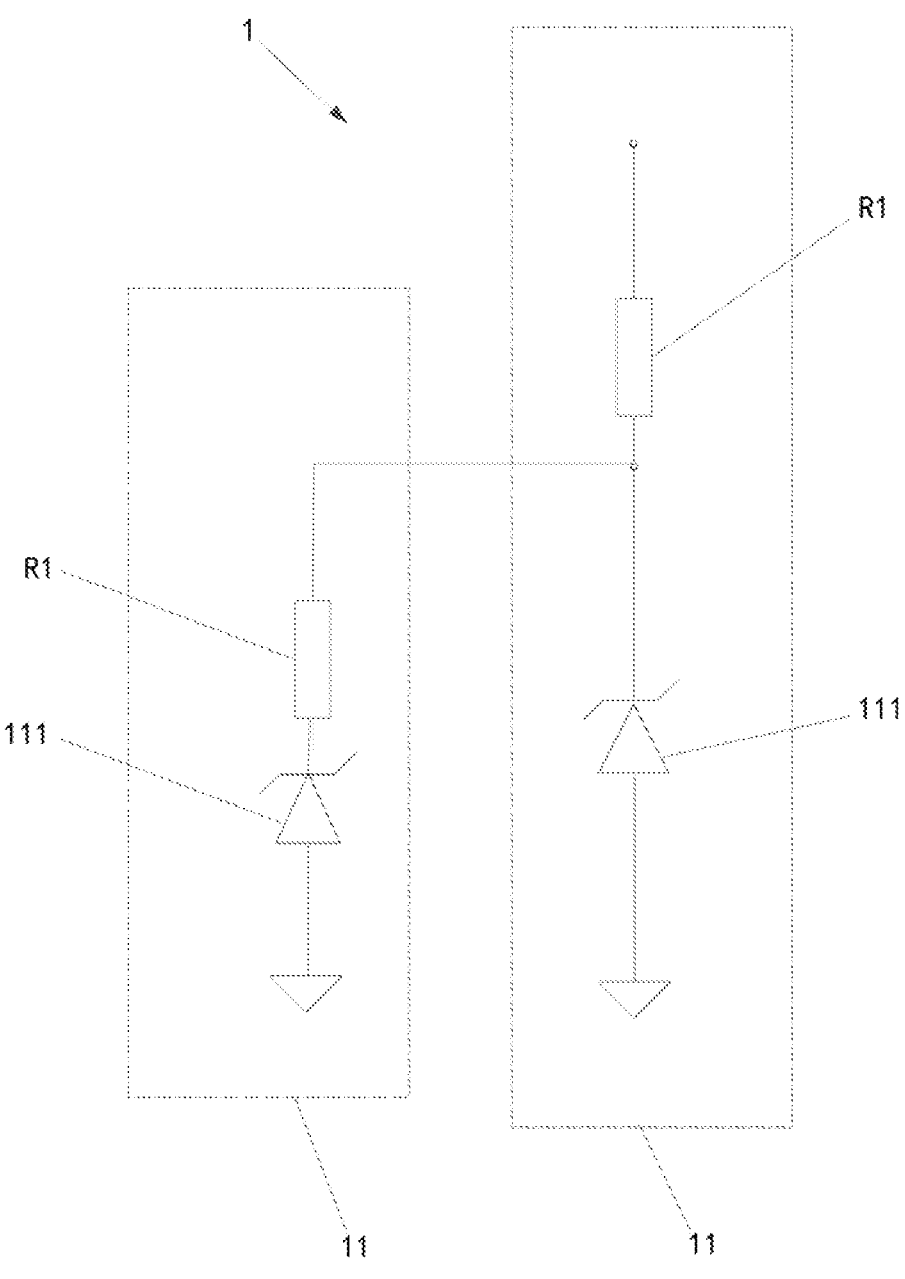
FIG. 2 is a schematic structural diagram of a first branch of another discharge circuit according to some embodiments of the present application.

As shown in FIG. 1 and FIG. 2, according to some embodiments of the present application, optionally, the first branch 1 includes N first sub-branches 11, and the first overvoltage protection device 111 is connected in series to each first sub-branch 11. The first overvoltage protection devices 111 of the N first sub-branches 11 are connected in parallel, N being a positive integer greater than or equal to 2.

Specifically, the first sub-branch 11 is a branch in the first branch 1 that can be independently connected. In other words, a single first sub-branch 11 can also achieve the effect of discharging the surge voltage. The first overvoltage protection device 111 is provided in each first sub-branch 11, and each first sub-branch 11 can discharge the surge voltage of the protected unit when working alone.

In this embodiment, the first branch 1 is provided as the N first sub-branches 11, and the N first overvoltage protection devices 111 are provided in parallel in the first branch 1, so that the N first overvoltage protection devices 111 can cooperatively discharge the surge received by the protected unit, thereby improving the capability of passively discharging the surge.

As shown in FIG. 1 and FIG. 2, according to some embodiments of the present application, optionally, the first sub-branch 11 further includes a first resistor R1 connected in series to the first overvoltage protection device 111. When the first branch 1 is connected to the protected unit, the first resistor R1 is located on a side closer to the protected unit than the first overvoltage protection device 111.

Specifically, the first resistor R1 is a current limiting resistor, and an appropriate resistance value may be set according to actual needs. In addition, the first resistor R1 in each first sub-branch 11 is used to protect the first overvoltage protection device 111, and also has a specific voltage drop function. Therefore, the first resistor R1 needs to be located on the side closer to the protected unit than the first overvoltage protection device 111.

In this embodiment of the present application, the first resistor R1 can effectively play a current limiting role, and can reduce power consumption of the first overvoltage protection device 111.

As shown in FIG. 2, according to some embodiments of the present application, optionally, a $1^{st}$ first sub-branch 11 of the first branch 1 is connected to the protected unit, one end of each of a $2^{nd}$ first sub-branch 11 to an $N^{th}$ first sub-branch 11 of the first branch 1 is sequentially connected between the first resistor R1 and the first overvoltage protection device 111 of a previous first sub-branch 11, and the other end of each of the $2^{nd}$ first sub-branch 11 to the $N^{th}$ first sub-branch 11 of the first branch 1 is grounded, N being a positive integer greater than or equal to 2.

Specifically, to facilitate description of the connection relationship between the N first sub-branches 11, the N first sub-branches 11 are defined as the $1^{st}$ first sub-branch 11 to the $N^{th}$ first sub-branch 11. The N first sub-branches 11 are connected according to the above rule. To be specific, one end of each first sub-branch 11 starting from the $2^{nd}$ first sub-branch 11 is connected between the first resistor R1 and the first overvoltage protection device 111 of the previous first sub-branch 11. Such a connection manner enables the latter first sub-branch 11 to further discharge a clamping voltage of the first overvoltage protection device 111 of the connected previous first sub-branch 11 whose voltage has been discharged, thereby achieving multi-stage voltage discharge.

In this embodiment of the present application, the N first sub-branches 11 are sequentially connected in the above manner, and the first branch 1 forms a continuous multi-stage passive discharge branch. To be specific, when the first sub-branch 11 has a limited ability to absorb and suppress, the second sub-branch 21 to an $N^{th}$ sub-branch connected in sequence can share the energy, and cooperate with the first sub-branch 11 to absorb the surge voltage together, which improves the ability to absorb the surge voltage. In addition, the service life of the first overvoltage protection device 111 can be enhanced as compared to the first branch 1 having only one first overvoltage protection device 111.

Figure 3:
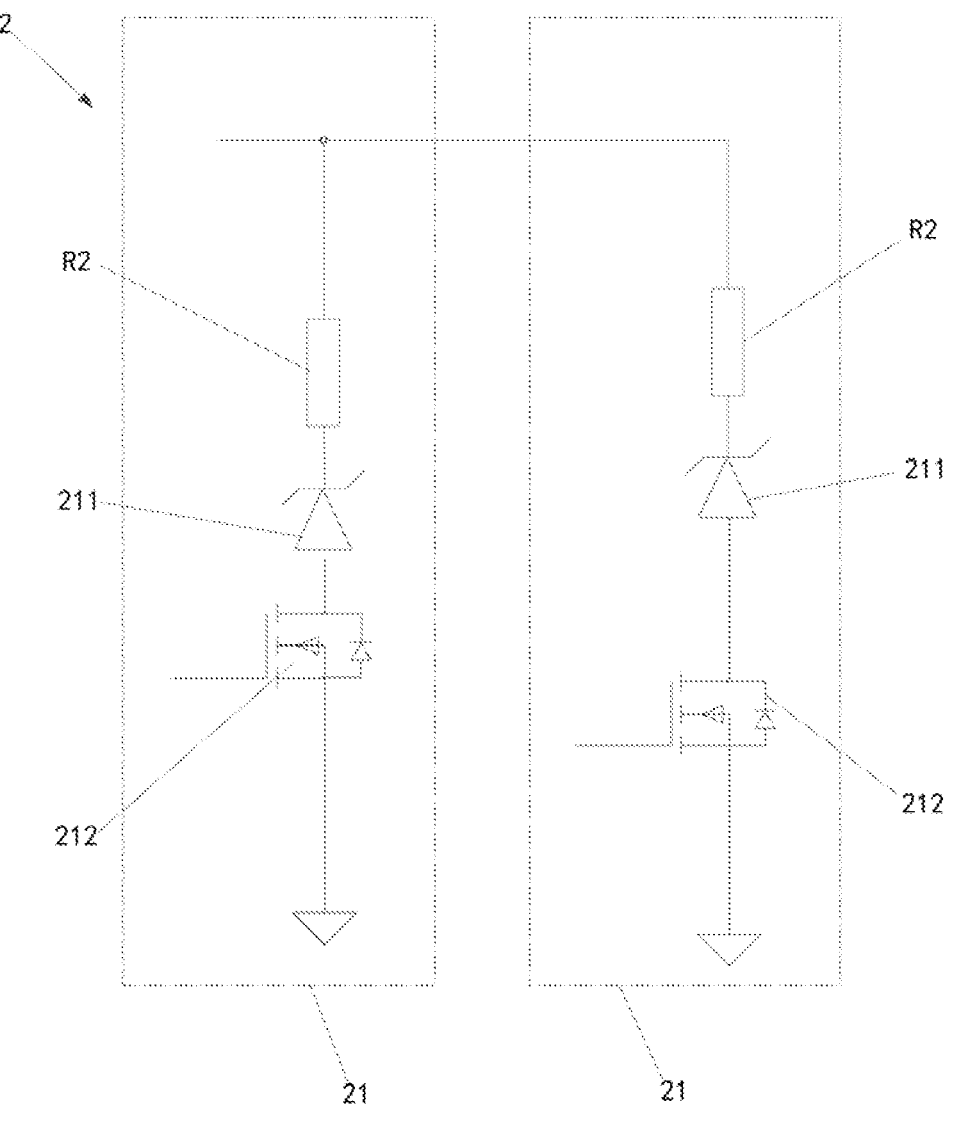
FIG. 3 is a schematic structural diagram of a second branch of still another discharge circuit according to some embodiments of the present application.

As shown in FIG. 1 and FIG. 3, according to some embodiments of the present application, optionally, the second branch 2 includes M second sub-branches 21 connected in parallel, and each of the second sub-branches 21 has a second overvoltage protection device 211 and a control switch 212 connected in series. M is a positive integer greater than or equal to 2, and all of the control switches 212 are configured to be connected to the control unit.

Specifically, the second sub-branch 21 is a branch in the second branch 2 that can be independently connected. In other words, a single second sub-branch 21, when connected, can actively discharge the surge voltage to assist the first branch 1. It should be noted that, each second sub-branch 21 needs to have the second overvoltage protection device 211 and the control switch 212 connected in series, to ensure that each second sub-branch 21 can implement its connection through the control of the control switch 212 by the control unit. In other words, one or more second sub-branches 21 can actively participate in the discharge through the control of the control unit.

In this embodiment of the present application, the M second sub-branches 21 are provided, and a plurality of active discharge paths are formed. When the battery management system 200 uses the discharge circuit 100 of the present application, one or more of the M second sub-branches 21 can be controlled by the control unit to participate in actively discharging the voltage, so as to handle various situations in which overvoltage occurs in the protected unit. This makes the combined active-passive manner for discharging the surge more practical, thereby improving the effect of discharging the surge.

As shown in FIG. 1 and FIG. 3, according to some embodiments of the present application, optionally, the second sub-branch 21 further includes a second resistor R2 connected in series to the second overvoltage protection device 211. One end of each of the M second sub-branches 21 closer to the second resistor R2 is connected to a position between the first resistor R1 and the first overvoltage protector of the $N^{th}$ first sub-branch 11, and one end of each of the M second sub-branches 21 closer to the second overvoltage protection device 211 is grounded, both M and N being positive integers greater than or equal to 2.

Specifically, the second resistor R2 in the second sub-branch 21 has the same function as the first resistor R1 in the first sub-branch 11, and is also a current limiting resistor. An appropriate resistance value may be set according to actual needs. In addition, the second resistor R2 in each second sub-branch 21 is used to protect the second overvoltage protection device 211, and also has a specific voltage drop function. Therefore, the second resistor R2 needs to be located on the side closer to the protected unit than the second overvoltage protection device 211.

The second resistor R2 can effectively reduce power consumption of the second overvoltage protection device 211, to provide protection.

As shown in FIG. 1 to FIG. 3, according to some embodiments of the present application, optionally, the first overvoltage protection device 111 and the second overvoltage protection device 211 each are a transient voltage suppression diode, and the control switch 212 is a MOS transistor.

Specifically, the working principle of the transient voltage suppression diode is similar to that of a common Zener diode. The transient voltage suppression diode is conducted when a voltage is higher than a breakdown voltage. However, the transient voltage suppression diode has a higher current conducting capability than the Zener diode. In addition, when the transient voltage suppression diode is impacted by a reverse transient high energy at its two poles, it can quickly change a high impedance between its two poles to a low impedance, and absorb up to several kilowatts of surge power at the same time, so that a voltage between the two poles is clamped at a safe value, thereby effectively protecting precision elements in an electronic circuit from being damaged due to the surge voltage.

In the present application, the selection of the MOS transistor as the control switch 212 is only an example solution, and does not constitute a limitation to the control switch 212. The MOS transistor is a metal-oxide-semiconductor field-effect transistor, or a metal-insulator-semiconductor.

The transient voltage suppression diode, used as the first overvoltage protection device 111 and the second overvoltage protection device 211, can suddenly reduce its impedance at a very high speed, and simultaneously absorb a large current, to clamp a voltage between its two terminals at a predetermined value, to prevent subsequent circuit elements from being damaged under the impact of transient high energy, which can effectively absorb the surge. The MOS transistor has characteristics of conventionality, low price, easy control, and stable control, and therefore using the MOS transistor as the control switch can make the entire discharge circuit 100 easy to control, thereby reducing the cost.

Figure 5:
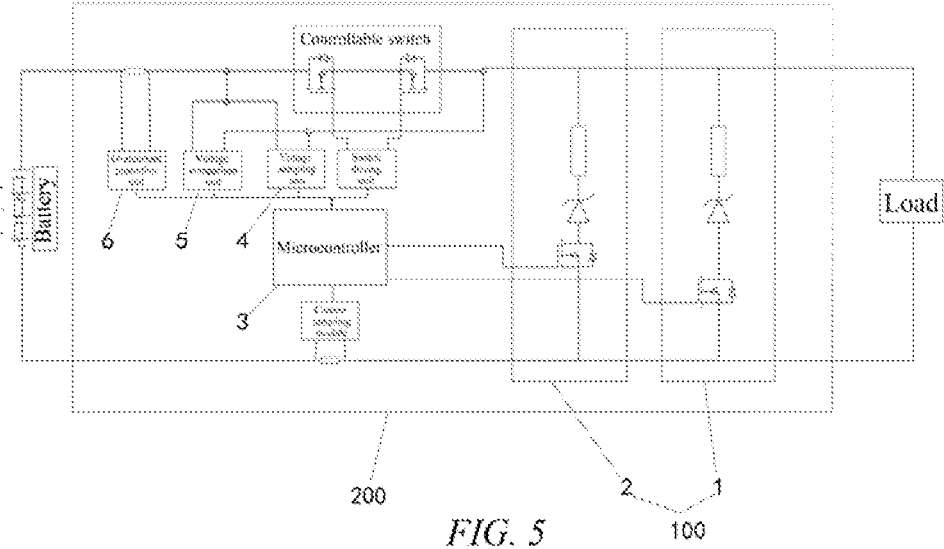
FIG. 5 is a schematic structural diagram of another battery management system according to some embodiments of the present application.

As shown in FIG. 4 and FIG. 5, according to some embodiments of the present application, the present application further provides the battery management system 200, including the discharge circuit 100, which is as shown in FIG. 1, according to any one of the foregoing solutions; a microcontroller 3, a voltage sampling unit 4, a multi-stage voltage comparison unit 5, an overcurrent protection unit 6, and other necessary units, components, or lines for implementing the function of the battery management system 200. At least one of the microcontroller 3, the voltage sampling unit 4, or the multi-stage voltage comparison unit 5 is connected to the control switch 212 of the second branch 2 of the discharge circuit 100. The control switch 212 receives a control signal from the microcontroller 3, the voltage sampling unit 4, or the multi-stage voltage comparison unit 5, and is opened or closed based on the control signal.

Specifically, without limiting the specific structure of the battery management system 200, the present application only adds the discharge circuit 100 to the battery management system 200, and the connection position of the discharge circuit 100 is as described in the description of the foregoing discharge circuit. However, it should be noted that, at least one of the microcontroller 3, the voltage sampling unit 4, or the multi-stage voltage comparison unit 5 in the battery management system 200 needs to be connected to the control switch 212 of the second branch 2 of the discharge circuit 100, so as to control the second branch 2 of the discharge circuit 100 to actively discharge the surge voltage.

The microcontroller 3, also referred to as a single chip microcomputer, is a chip-level computer formed by properly reducing the frequency and specification of a central processing unit, and integrating peripheral interfaces such as a memory, a counter, a USB, an A/D converter, etc. on a single chip. The microcontroller 3 is the core control part of the battery management system 200, and is responsible for signal detection and command control. The voltage sampling unit 4 is a component configured to acquire a voltage signal of a detected unit, which is known to technical personnel and thus not detailed herein. The multi-stage voltage comparison unit 5 is formed by a plurality of voltage comparison units having different comparison thresholds, and configured to compare an input signal with a preset value and output a signal based on a comparison result. The multi-stage voltage comparison unit 5 may be a comparator or a chip having a data processing capability.

In this embodiment of the present application, by additionally providing the discharge circuit 100, when the protected unit of the battery management system 200 is attacked by a relatively large surge, the first branch 1 and the second branch 2 in the discharge circuit 100 may be used to discharge the surge voltage of the protected unit in a manner combining active discharge and passive discharge, to ensure that no overvoltage occurs in the protected unit, thereby further protecting the battery management system 200 from being damaged due to the relatively large surge.

As shown in FIG. 4 and FIG. 5, according to some embodiments of the present application, the battery management system 200 further includes: a switch control unit (not shown in the figure). The switch control unit is connected to a control terminal of the control switch 212 of the second branch 2 of the discharge circuit 100. At least one of the microcontroller 3, the voltage sampling unit 4, or the multi-stage voltage comparison unit 5 is connected to the switch control unit.

Specifically, the switch control unit may be a switch control circuit, an arithmetic module, or an electronic component, as long as it can control the closing and opening of the control switch 212 according to the control signal sent by any one of the microcontroller 3, the voltage sampling unit 4, or the multi-stage voltage comparison unit 5 in the battery management system 200.

The provision of the switch control unit can make it more convenient and stable to control the control switch 212 in the second branch 2.

Figure 6:
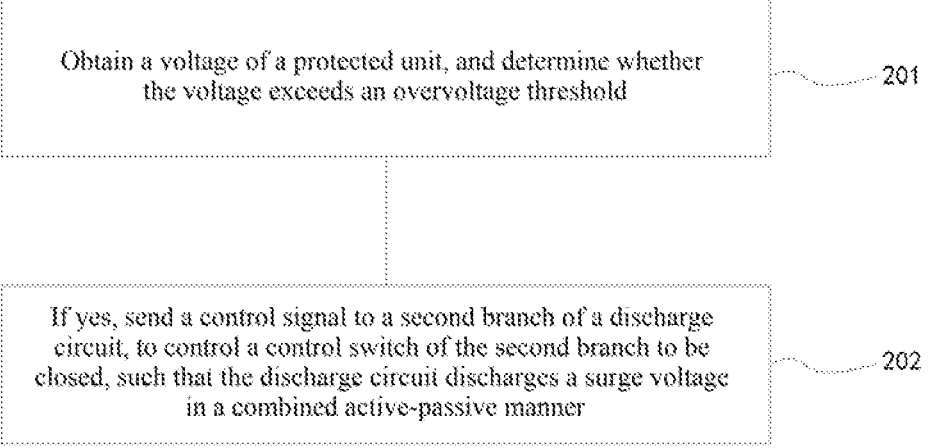
FIG. 6 is a schematic flowchart of a discharge protection method for a battery management system according to some embodiments of the present application.

As shown in FIG. 6, according to some embodiments of the present application, the present application further provides a discharge protection method for a battery management system, applied to the battery management system 200 as shown in FIG. 4 and FIG. 5, and including the following steps.

201: Obtain a voltage of a protected unit, and determine whether the voltage exceeds an overvoltage threshold.

Specifically, the real-time working microcontroller and multi-stage voltage comparison unit in the battery management system may be used to obtain the voltage of the protected unit, and determine whether the voltage exceeds the overvoltage threshold. If no, only the first branch in the discharge circuit performs the passive discharge. Otherwise, if the voltage exceeds the overvoltage threshold, the following step 202 is performed.

202: Send a control signal to the second branch of the discharge circuit, to control the control switch of the second branch to be closed, such that the discharge circuit discharges a surge voltage in a combined active-passive manner.

Specifically, the microcontroller, the voltage sampling unit, or the multi-stage voltage comparison unit may be used to send the control signal to the control switch of the second branch, to control the control switch to be closed, such that the second branch of the discharge circuit participates in actively discharging the surge voltage. When the obtained voltage of the protected unit does not exceed the overvoltage threshold, the control signal is not sent to the control switch in the second branch, such that only the first branch of the discharge circuit works, to passively discharge the surge voltage.

In this embodiment of the present application, according to this method, when overvoltage occurs in the protected unit, if overvoltage still exists after the first branch passively discharges the surge voltage, the second branch may be controlled to be connected, to implement active surge discharge. This allows to discharge a high-energy surge in a combined active-passive manner, thereby preventing the overvoltage of the protected unit from further causing overvoltage in the battery management system. This method is applicable to the battery management system having the above discharge circuit, to enable an efficient operation of the discharge circuit in the battery management system.

As shown in FIG. 7, according to some embodiments of the present application, specifically:

301: Obtain a voltage and a current of a positive terminal of a battery, and determine whether the voltage and the current reach a protection threshold.

Specifically, the microcontroller, the multi-stage voltage comparison unit, and the overcurrent protection unit in the battery management system may be used to obtain the voltage and the current of the positive terminal V1 of the battery, namely a voltage and a current of a positive terminal of a battery module, and determine whether the voltage and/or the current reach the protection threshold. If the obtained voltage and current of the positive terminal of the battery do not reach the protection threshold, the operation is normal, and the controllable switch is not opened; and if the obtained voltage and current of the positive terminal of the battery reach the protection threshold, the following step 302 is performed.

302: Control a controllable switch between the positive terminal of the battery and a positive terminal of a battery pack to be opened.

Specifically, the microcontroller, the multi-stage voltage comparison unit, or the overcurrent protection unit in the battery management system may be used to control the controllable switch to be opened, to protect the battery module from overvoltage and overcurrent. The controllable switch is a component that is between the positive terminal of the battery and the positive terminal of the battery pack and that can be controlled to be closed and opened by using an electric signal. The selection of the model and type of the specific component is known to technical personnel.

303: Send a control signal to a second branch of a discharge circuit, to control a control switch of the second branch to be closed, such that the discharge circuit discharges a surge voltage in a combined active-passive manner.

304: Obtain a voltage of the positive terminal of the battery pack, and determine whether the voltage exceeds the overvoltage threshold. If no, only the first branch in the discharge circuit performs the passive discharge. Otherwise, if the voltage exceeds the overvoltage threshold, the following step 305 is performed.

305: Send a control signal to the second branch of the discharge circuit, to control the control switch of the second branch to be closed, such that the discharge circuit discharges the surge voltage in a combined active-passive manner.

In this embodiment of the present application, the positive terminal V2 of the battery pack is used as the protected unit, and when overvoltage and/or overcurrent occur in the positive terminal V1 of the battery, and the generated surge acts on the positive terminal V2 of the battery pack, the second branch may be controlled to be connected to actively discharge the surge voltage while the first branch of the discharge protection circuit performs the passive discharge, to ensure that no overvoltage occurs in the positive terminal V2 of the battery pack, thereby protecting the entire battery management system from being damaged under the action of the surge.

Further, in some embodiments, the method of "obtaining a voltage of a protected unit, and determining whether the voltage exceeds an overvoltage threshold; and if yes, sending a control signal to a second branch of a discharge circuit, to control a control switch of the second branch to be closed, such that the discharge circuit discharges a surge voltage in a combined active-passive manner" is performed cyclically, until an obtained voltage of the protected unit does not exceed the overvoltage threshold.

A cyclic active discharge of the surge voltage can make a relatively large surge quickly discharged, to ensure that the voltage of the protected unit is below the protection threshold, and no overvoltage occurs, thereby avoiding a failure to discharge the voltage of the protected unit below the protection threshold through a single active discharge.

In some embodiments, the obtained voltage of the protected unit is divided into a plurality of levels from low to high when the obtained voltage of the protected unit exceeds the overvoltage threshold; and a quantity of second sub-branches in the discharge circuit that are connected is controlled to gradually increase, corresponding to the plurality of voltage levels from high to low.

Specifically, an appropriate level may be set according to an actual magnitude of the surge voltage. Then, a quantity of second sub-branches that participate in actively discharging the surge voltage is selected, according to a power of the first branch and a power of the second sub-branch in the second branch of the selected discharge circuit. The specific quantity may be selected according to actual design requirements.

The quantity of second sub-branches to work together to discharge the surge can be intelligently controlled by dividing the overvoltage into the plurality of levels, so as to implement intelligent and rapid surge discharge.

According to some embodiments of the present application, the present application further provides a battery, including: a battery management system in the foregoing embodiment.

According to some embodiments of the present application, the present application further provides an electrical apparatus, including a battery according to any one of the foregoing embodiments. The battery is configured to provide electrical energy for the electrical apparatus.

The electrical apparatus may be, but is not limited to, a mobile phone, a tablet, a notebook computer, an electric toy, a power tool, a battery cart, an electric car, a ship, a spacecraft, etc. The electric toy may include a stationary or mobile electric toy, such as a game console, an electric car toy, an electric ship toy, an electric airplane toy, etc. The spacecraft may include an airplane, a rocket, a space shuttle, a spaceship, etc.

As shown in FIG. 1 to FIG. 5, according to some embodiments of the present application, the positive terminal V2 of the battery pack is used as the protected unit. The discharge circuit 100 includes the first branch 1 and the second branch 2. The first branch 1 has the first resistor R1 and the first overvoltage protection device 111 connected in series. The second branch 2 has the second resistor R2, the second overvoltage protection device 211, and the control switch 212. The second branch 2 is connected in parallel at the first overvoltage protection device 111 of the first branch 1. One end of the first branch 1 is connected at the positive terminal V2 of the battery pack, and the other end of the first branch 1 is grounded. In this way, the discharge circuit 100 is connected to the positive terminal V2 of the battery pack. The control switch 212 of the second branch 2 is connected to at least one of the microcontroller 3, the voltage sampling unit 4, or the multi-stage voltage comparison unit 5 in the battery management system 200.

When the battery management system 200 obtains, via the microcontroller 3, the multi-stage voltage comparison unit 5, or the overcurrent protection unit 6, the voltage and the current of the positive terminal V1 of the battery, and determines that the voltage and/or the current reach the protection threshold, the microcontroller 3, the multi-stage voltage comparison unit 5, or the overcurrent protection unit 6 in the battery management system 200 controls the controllable switch to be opened, so as to protect the battery from overvoltage and overcurrent. The currently generated surge acts on the positive terminal V2 of the battery pack. The first branch 1 of the discharge circuit 100 passively discharges the surge voltage. At the same time, the microcontroller 3, the voltage sampling unit 4, or the multi-stage voltage comparison unit 5 controls to send the control signal to the control switch 212 of the second branch 2, to control the control switch 212 to be closed, such that the second branch 2 of the discharge circuit 100 participates in actively discharging the surge voltage.

Then, the microcontroller 3 and the multi-stage voltage comparison unit 5 obtain the voltage of the positive terminal V2 of the battery pack as the protected unit, and determine whether the voltage exceeds the overvoltage threshold. If yes, the microcontroller 3, the voltage sampling unit 4, or the multi-stage voltage comparison unit 5 is used again to control to send the control signal to the control switch 212 of the second branch 2, to control the control switch 212 to be closed, such that the second branch 2 participates in actively discharging the surge voltage. This process is performed cyclically until the voltage of the positive terminal V2 of the battery pack is below the overvoltage threshold. In this case, the surge voltage may be passively discharged only by using the first branch 1 of the discharge circuit 100.

Finally, it should be noted that, the above embodiments are provided to explain the technical solutions of the present application, but not to limit them. Although the present application has been described in detail with reference to the foregoing embodiments, those of ordinary skill in the art should understand that, the technical solutions in the foregoing embodiments can be modified, or some or all of the technical features can be equivalently replaced. These modifications or replacements do not make the essence of the corresponding technical solutions depart from the scope of the technical solutions of the embodiments of the present application, which shall be included in the scope of the claims and description of the present application. In particular, as long as there is no structural conflict, each technical feature mentioned in each embodiment can be combined in any manner. The present application is not limited to the specific embodiments disclosed herein, but includes all technical solutions falling within the scope of the claims.

What is claimed is:

1. A discharge circuit, comprising:
a first branch configured to be connected to a protected unit, and comprising a first overvoltage protection device configured to passively discharge a surge voltage; and
a second branch comprising a second overvoltage protection device and a control switch connected in series, the second branch being connected in parallel to the first branch;
wherein:
the control switch is configured to be connected to a control unit, and to be opened or closed based on a control signal of the control unit;
the first branch comprises N sub-branches, N being a positive integer greater than or equal to 2;
the first overvoltage protection device is one of N first overvoltage protection devices each connected in series to one of the sub-branches;
the N first overvoltage protection devices are connected in parallel;
each of the sub-branches further comprises a resistor connected in series to the corresponding first overvoltage protection device; and
when the first branch is connected to the protected unit, the resistor is located on a side closer to the protected unit than the corresponding first overvoltage protection device.

2. The discharge circuit according to claim 1, wherein a $1^{st}$ sub-branch of the first branch is connected to the protected unit, one end of each of a $2^{nd}$ sub-branch to an $N^{th}$ sub-branch is connected between the resistor and the first overvoltage protection device of a previous sub-branch, and another end of each of the $2^{nd}$ sub-branch to the $N^{th}$ sub-branch is grounded.

3. The discharge circuit according to claim 1, wherein:
the second branch comprises M sub-branches connected in parallel, M being a positive integer greater than or equal to 2;
the second overvoltage protection device is one of M second overvoltage protection devices each belonging to one of the sub-branches;
the control switch is one of M control switches each belonging to one of the sub-branches and connected in series to the corresponding second overvoltage protection device; and all of the control switches are configured to be connected to the control unit.

4. The discharge circuit according to claim 1, wherein:

the N sub-branches are N first sub-branches;

the resistors are first resistors of the first sub-branches;

the second branch comprises M second sub-branches connected in parallel, M being a positive integer greater than or equal to 2;

the second overvoltage protection device is one of M second overvoltage protection devices each belonging to one of the second sub-branches;

the control switch is one of M control switches each belonging to one of the second sub-branches and connected in series to the corresponding second overvoltage protection device;

all of the control switches are configured to be connected to the control unit each of the second sub-branches further comprises a second resistor connected in series to the corresponding second overvoltage protection device; and one end of each of the M second sub-branches closer to the corresponding second resistor is connected to a position between the first resistor and the first overvoltage protector of an $N^{th}$ first sub-branch, and one end of each of the M second sub-branches closer to the corresponding second overvoltage protection device is grounded.

5. The discharge circuit according to claim 1, wherein the first overvoltage protection device and the second overvoltage protection device each include a transient voltage suppression diode.

6. The discharge circuit according to claim 1, wherein the control switch includes a MOS transistor.

7. A battery management system, comprising:

a discharge circuit comprising:

a first branch configured to be connected to a protected unit, and comprising a first overvoltage protection device configured to passively discharge a surge voltage; and a second branch connected in parallel to the first branch and comprising a second overvoltage protection device and a control switch connected in series, the control switch being configured to be connected to a control unit, and to be opened or closed based on a control signal of the control unit;

a microcontroller;

a voltage sampling unit; and a multi-stage voltage comparison unit;

wherein:

at least one of the microcontroller, the voltage sampling unit, or the multi-stage voltage comparison unit is connected to the control switch of the second branch of the discharge circuit, and the control switch receives a control signal from the at least one of the microcontroller, the voltage sampling unit, or the multi-stage voltage comparison unit, and is opened or closed based on the control signal;

the first branch comprises N sub-branches, N being a positive integer greater than or equal to 2;

the first overvoltage protection device is one of N first overvoltage protection devices each connected in series to one of the sub-branches;

the N first overvoltage protection devices are connected in parallel;

each of the sub-branches further comprises a resistor connected in series to the corresponding first overvoltage protection device; and when the first branch is connected to the protected unit, the resistor is located on a side closer to the protected unit than the corresponding first overvoltage protection device.

8. The battery management system according to claim 7, further comprising:

a switch control unit connected to a control terminal of the control switch of the second branch of the discharge circuit;

wherein the at least one of the microcontroller, the voltage sampling unit, or the multi-stage voltage comparison unit is connected to the switch control unit.

9. The battery management system according to claim 7, wherein a $1^{st}$ sub-branch of the first branch is connected to the protected unit, one end of each of a $2^{nd}$ sub-branch to an $N^{th}$ sub-branch is connected between the resistor and the first overvoltage protection device of a previous sub-branch, and another end of each of the $2^{nd}$ sub-branch to the $N^{th}$ sub-branch is grounded.

10. The battery management system according to claim 7, wherein:

the second branch comprises M sub-branches connected in parallel, M being a positive integer greater than or equal to 2;

the second overvoltage protection device is one of M second overvoltage protection devices each belonging to one of the sub-branches;

the control switch is one of M control switches each belonging to one of the sub-branches and connected in series to the corresponding second overvoltage protection device; and all of the control switches are configured to be connected to the control unit.

11. A discharge protection method, applied to the battery management system according to claim 7, and comprising:

obtaining a voltage of the protected unit;

determining whether the voltage exceeds an overvoltage threshold; and in response to the voltage exceeding the overvoltage threshold, sending a control signal to the second branch of the discharge circuit, to control the control switch of the second branch to be closed, such that the discharge circuit discharges a surge voltage in a combined active-passive manner.

12. The discharge protection method according to claim 11, wherein the protected unit includes a positive terminal of a battery;

the method further comprising, before obtaining the voltage of the protected unit and determining whether the voltage exceeds the overvoltage threshold:

obtaining the voltage and a current of the positive terminal;

determining whether the voltage and the current reach a protection threshold;

in response to the voltage and the current reaching the protection threshold, controlling a controllable switch between the positive terminal of the battery and a positive terminal of a battery pack to be opened; and sending a control signal to the second branch of the discharge circuit, to control the control switch of the second branch to be closed, such that the discharge circuit discharges the surge voltage in the combined active-passive manner.

13. The discharge protection method according to claim 11, wherein the method is performed cyclically, until the voltage of the protected unit does not exceed the overvoltage threshold.

14. The discharge protection method according to claim 13, wherein:

the obtained voltage of the protected unit is divided into a plurality of levels from low to high in response to the obtained voltage of the protected unit exceeding the overvoltage threshold; and a quantity of sub-branches in the discharge circuit that are connected is controlled to gradually increase, corresponding to the plurality of voltage levels from high to low.

15. A discharge circuit, comprising:

a first branch configured to be connected to a protected unit, and comprising a first overvoltage protection device configured to passively discharge a surge voltage; and a second branch comprising a second overvoltage protection device and a control switch connected in series, the second branch being connected in parallel to the first branch;

wherein:

the control switch is configured to be connected to a control unit, and to be opened or closed based on a control signal of the control unit;

the second branch comprises M sub-branches connected in parallel, M being a positive integer greater than or equal to 2;

the second overvoltage protection device is one of M second overvoltage protection devices each belonging to one of the sub-branches;

the control switch is one of M control switches each belonging to one of the sub-branches and connected in series to the corresponding second overvoltage protection device; and all of the control switches are configured to be connected to the control unit.

* * * * *